United States Patent [19]
Khuntia

[11] 3,801,163

[45] Apr. 2, 1974

[54] TRACK CHAIN SEAL

[75] Inventor: Natabara Khuntia, Hudson, Ohio

[73] Assignee: General Motors Corporation, Detroit, Mich.

[22] Filed: Nov. 6, 1972

[21] Appl. No.: 304,081

[52] U.S. Cl. ................................................. 305/11
[51] Int. Cl. ............................................. B62d 55/20
[58] Field of Search ........................... 305/11, 14, 58

[56] References Cited
UNITED STATES PATENTS

| | | | |
|---|---|---|---|
| 3,560,059 | 2/1971 | Miyake | 305/11 |
| 2,411,214 | 11/1946 | Keech | 305/11 |
| 2,389,874 | 11/1945 | Searles | 305/11 |
| 2,699,974 | 1/1955 | Deffenbaugh | 305/11 |
| 3,392,984 | 7/1968 | Reinsma | 305/11 |

Primary Examiner—Richard J. Johnson
Attorney, Agent, or Firm—Edward J. Biskup

[57] ABSTRACT

A track link assembly including a pair of link members joined together by a pin and bushing. The adjacent link members are provided with an annular recess which receives an annular seal and a reinforcement ring arranged in axially staggered relationship for sealing the recess so as to prevent foreign matter from entering the clearance area between the pin and bushing.

3 Claims, 4 Drawing Figures

PATENTED APR 2 1974 3,801,163
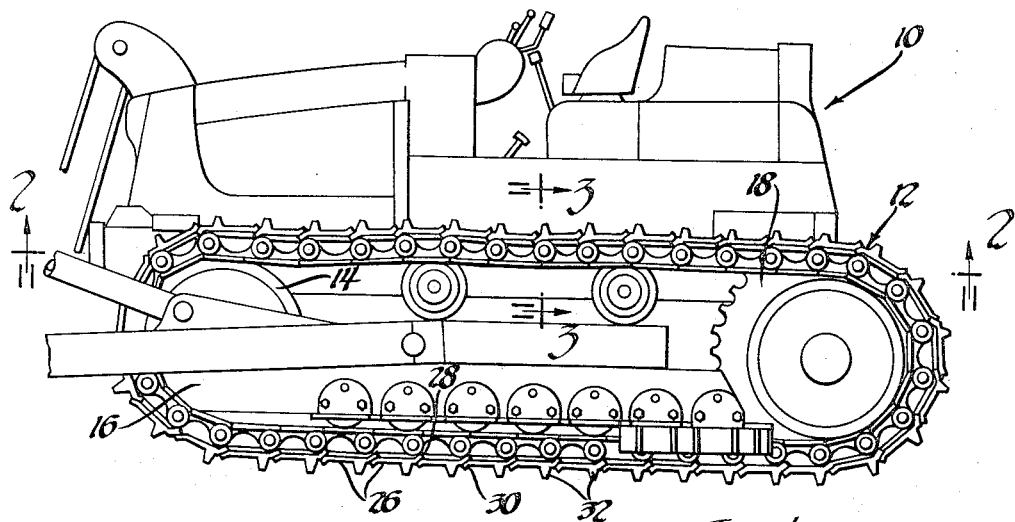
Fig.1
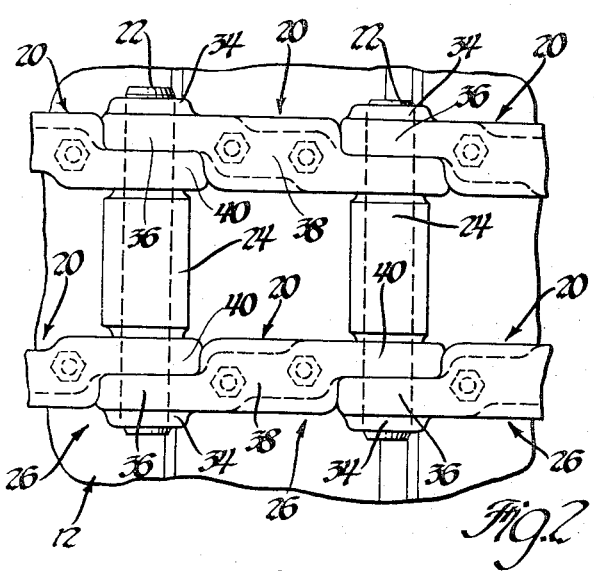
Fig.2
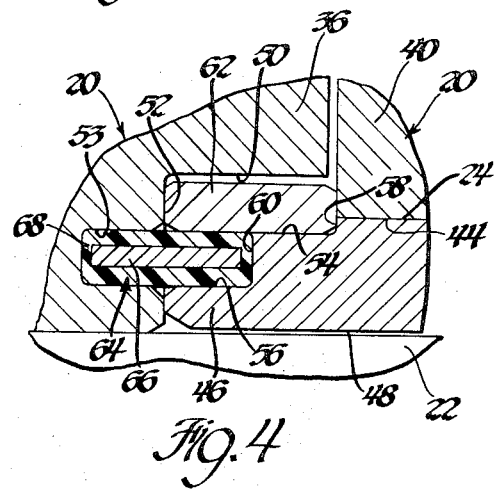
Fig.4
Fig.3

TRACK CHAIN SEAL

This invention concerns a hinge connection for an endless track chain and more particularly a sealing arrangement that can be applied to such a hinge connection.

The typical track chain on a crawler tractor is a continuous chain composed of two rows of forged steel links held together by pins and bushings. The configuration of the links are such that, when joined by the bushings and pins, their ends overlap with one end of each link being positioned inboard at a joint while the other end is positioned outboard at the next joint. The bushing is pressed into the ends of the inboard links at each joint while the pin runs through the bushing and is pressed into the ends of the outboard links at each joint. The pins are free to turn in the bushing which allows the links to pivot and permits the chain to follow the curvature of the front idler and the drive sprocket. For added strength, the bushings protrude into the ends of the outboard links at the joints, however, sufficient clearance is provided so as to eliminate the possibility of any interference with the pivoting action described above.

As is well known, crawler tractors employing track chains of the above described type operate in an environment which is of a particularly abrasive nature. As a result, the clearance between the bushing and pin is frequently subjected to the entrance of foreign matter in the form of fine particles which act upon the adjacent sliding surfaces during relative movement thereof and accelerate the wear of the hinge connection. This can cause the pitch of the track chain to be increased and the bushings brought into abnormal engagement with the drive sprocket.

Accordingly, the objects of the present invention are to provide a sealing arrangement for a track link assembly that prevents foreign matter from entering the clearance area between the pin and bushing; to provide a sealing arrangement for a hinge connection that includes a pair of contacting ring members of substantially the same cross-sectional size but of a different diameter, such ring members being combined so as to provide a labyrinth path which helps prevent the entry of abrasive material towards the relatively rotatable surfaces between the bushing and pin; to provide a hinge connection having a pair of juxtapositioned link members joined together by a pin and bushing and provided with an annular recess which receives an annular seal and a reinforcement ring arranged in axially staggered relationship for sealing the recess; to provide a ring type seal member for a track link assembly in which the seal member has an annular metallic insert and an outer body made of resilient material.

The above objects and others are realized in accordance with the invention with a track link assembly having first and second pivotable link members. A tubular bushing having a cylindrical opening extending therethrough has one end thereof secured to the first link member and a pin extends through the cylindrical opening and is secured to the second link member. The end part of the bushing is formed with a two-step circumferential shoulder which is located within an annular recess formed in the second link member and defined by an axially extending wall and a vertical wall. An annular groove is formed in the vertical wall and is located in axial alignment with one step of the two-step shoulder so as to provide a seat for a ring type seal having a resilient outer body. In addition, a reinforcement ring of substantially the same cross-sectional dimension as that of the ring type seal is supported by the other step of the two-step shoulder and extends axially to a point intermediate the axial length of the ring type seal so as to provide a labyrinth path which helps prevent entry of foreign matter into the cylindrical opening in the tubular bushing.

A more complete understanding of the invention will be derived from the following detailed description when taken with the drawings in which;

FIG. 1 is an elevational view showing a crawler tractor employing an endless track chain made according to the invention;

FIG. 2 is an enlarged plan view taken on line 2—2 of FIG. 1;

FIG. 3 is an enlarged sectional view taken on line 3—3 of FIG. 1 showing one of the hinge connections of the track chain made according to the invention; and FIG. 4 is a further enlarged view showing in detail the sealing arrangement employed with this invention.

Referring to the drawings and more particularly FIG. 1 thereof, a crawler tractor 10 is shown having the usual endless track chain 12 entrained about an idler wheel 14, a roller frame 16, and a drive sprocket 18. The track chain 12 consists of a plurality of identically formed and laterally spaced link members 20 arranged in two rows and interconnected by identically formed and transversely extending pins 22 and bushings 24 which provide hinge connections permitting the chain to articulate as it moves about the idler wheel 14 and drive sprocket 18 of the tractor 10.

As best seen in FIGS. 1 and 2, each pair of laterally aligned link members 20 supports a track shoe 26 comprising a flat plate portion, the opposite ends of which are formed with integral extensions 28 and 30 the former of which is curved towards the roller frame 16 while the latter is curved outwardly so as to provide an overlapping arrangement between adjacent track shoes. Each track shoe 26 is also formed with an integral grouser 32 which extends transversely across the track shoe 26.

Each pair of laterally aligned link members 20 are identical in construction as aforementioned and each link member has one end thereof provided with a boss 34 formed with a thin section 36 which merges with an enlarged central section 38 which in turn is integrally formed with a section 40 similar to that at the opposite end except for the elimination of the boss. As seen in FIG. 3, the sections 36 and 38 have openings 42 and 44 formed therein for respectively accommodating the pin 22 and bushing 24. The sections 36 and 38 are offset with respect to each other so as one link member is connected to the adjoining link member through the pin and bushing assembly, a continuous chain is formed in which the opposite sides of the link members are in substantial longitudinal alignment.

As best seen in FIG. 3, each opening 42 is adapted to be aligned with the opposite opening 44 of the adjacent link member for receiving the pin and bushing assemblies so as to connect the link members together. Moreover, the inner side wall of each section 36 includes an annular recess surrounding and concentric with the opening 42. The bushing 24 is firmly secured as by a press-fit in the opening 44 of section 40 and has an end part 46 that projects slightly laterally outwardly beyond section 40 and is located in the recess in section 36. The bushing 24 is tubular in configuration and has a cylindrical opening 48 through which the pin 22 extends for firm engagement as by a press-fit within the openings 42 in the laterally spaced and axially aligned sections 36. There is a slight clearance between the outer diameter of the pin 22 and the cylindrical opening 48 in the bushing 24 so as to permit the pairs of link members to articulate relative to each other.

As seen in FIG. 4, the aforementioned recess is defined by an axially extending wall 50 and a vertical wall 52 the latter of which is provided with an annular groove 53 concentric with opening 42. The recess receives the end part 46 of the bushing 24 which in this instance is formed with a two-step shoulder defined by axially extending surfaces 54 and 56 and a pair of vertically extending surfaces 58 and 60. The surfaces 54 and 56 are annular in form and concentric with the opening 48 and axially aligned with the upper and lower surfaces of groove 53.

A sealing arrangement is provided in the recess and consists of a pair of ring members 62 and 64 which are of substantially the same cross-sectional size but of different diameters. The ring member 64 comprises a metallic annular insert 66 that is completely enclosed by an outer body 68 of elastomeric material such as polyurethane while the ring member 62 is made entirely out of metal. The ring member 64 has a portion thereof located within the annular groove 53 formed in the wall 52 while another portion is seated on the axially aligned surface 56 of the two-step shoulder. The ring member 62 serves as a retainer or reinforcement member and has a portion thereof seated on the surface 54 of the two-step shoulder and has the remaining portion thereof extending axially outwardly to a point intermediate the side edges of the ring member 64. The sealing arrangement is such that when the ring members 62 and 64 are assembled to the bushing 24 together with section 36 of the link member, the resilient material of the outer body 68 expands radially to seal the recess. In this regard, it will be noted that in addition, the staggered relationship of the ring members 62 and 64 provide a labyrinth path which makes it more difficult for the entry of foreign matter into the clearance area between the bushing 24 and the pin 22.

Various changes and modifications can be made in this construction without departing from the spirit of the invention. Such changes and modifications are contemplated by the inventor and he does not wish to be limited except by the scope of the appended claims.

I claim:

1. In a hinge connection between two link members of a tractor track chain having a pin and a bushing rotatable thereon and in which one link member is press-fitted on the pin and the other link member is press-fitted on the bushing, said link members being located side by side with one of the link members having an annular recess concentric with the pin, a seal arrangement provided in said recess to prevent entry of foreign matter toward the relatively rotatable surfaces between the bushing and the pin, said seal arrangement comprising a pair of separate ring members, adapted to engage each other, each ring member being a different size and having a portion thereof directly supported by the outer surface of said bushing in axially staggered relationship, and one of said ring members including a metal insert having the entire outer body thereof surrounded by a resilient material so that upon assembly of said link members with said pin and bushing the resilient material expands radially to seal the recess.

2. A track link assembly comprising first and second pivotable link members, a bushing having a cylindrical opening extending therethrough, said first link member secured to said bushing adjacent one end thereof, a pin extending through said cylindrical opening in said bushing and secured to said second link member, a pair of vertically and axially spaced annular surfaces formed on the end portion of the bushing so as to form a two-step shoulder, an annular recess defined by a cylindrical wall and a vertical wall formed in the second link member for accommodating said pair of annular surfaces, an annular groove formed in said vertical wall in axial alignment with one of said annular surfaces, a ring type seal having a resilient outr body, one portion of said ring type seal located in the annular groove and another portion thereof supported by said one of said annular surfaces, and a retainer ring supported by the other of said annular surfaces and extending axially to a point intermediate the side edges of the ring type seal so as to hold the ring type seal in position and provide a labyrinth path for preventing entry of foreign matter into said cylindrical opening in said bushing.

3. A track chain assembly comprising first and second pivotable link members, a tubular bushing having a cylindrical opening extending therethrough, said first link member secured to said tubular bushing adjacent one end thereof, a pin extending through said cylindrical opening in said bushing and secured to said second link member, a two-step circumferential shoulder formed on the end portion of the bushing, an annular recess defined by an axially extending wall and a vertical wall formed in the second link member for accommodating said two-step shoulder, a U-shaped annular groove formed in said vertical wall in axial alignment with one step of said two-step shoulder, a ring-type seal including a metal insert and a resilient outer body, said ring type seal being rectangular in cross-section and having a longitudinal length greater than its width, one portion of said ring type seal located in the annular groove and another portion supported by said one step of the two-step shoulder, and a retainer ring rigidly supported by the other step of said two-step shoulder and extending axially to a point intermediate the side edges of the ring type seal so as to hold the ring type seal in position and provide a labyrinth path for preventing entry of foreign matter into said cylindrical opening said tubular bushing.

* * * * *